Dec. 6, 1955    P. E. BEAUDOUX ET AL    2,725,945
SELECTIVE BRAKE CONTROL MECHANISM FOR TRACTOR STEERING
Filed Nov. 14, 1951    3 Sheets-Sheet 1

Inventors
Pierre E. Beaudoux
Francois J. B. Berry
By Young, Emery & Thompson
Attys.

Dec. 6, 1955

P. E. BEAUDOUX ET AL 2,725,945

SELECTIVE BRAKE CONTROL MECHANISM FOR TRACTOR STEERING

Filed Nov. 14, 1951

Inventors
Pierre E. Beaudoux
Francois J. B. Berry
By Young, Emery & Thompson
Attys.

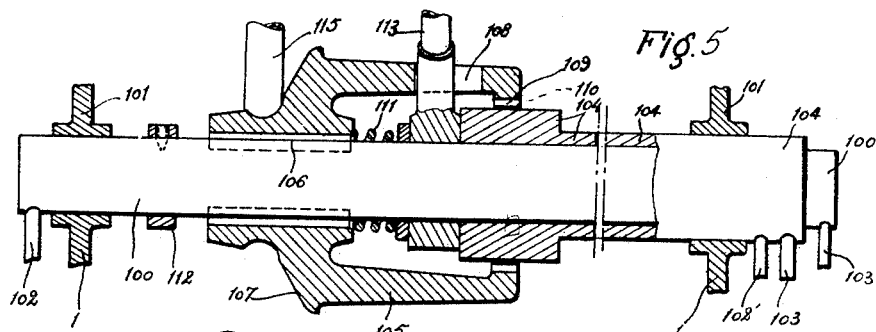
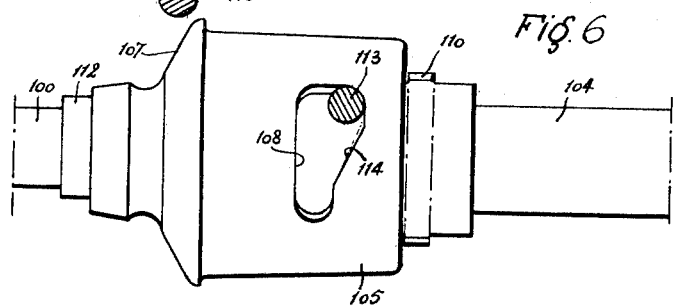
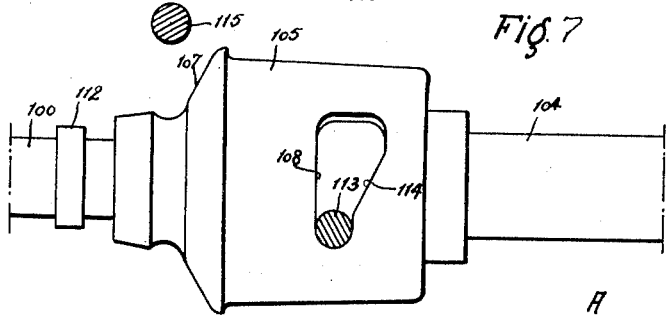
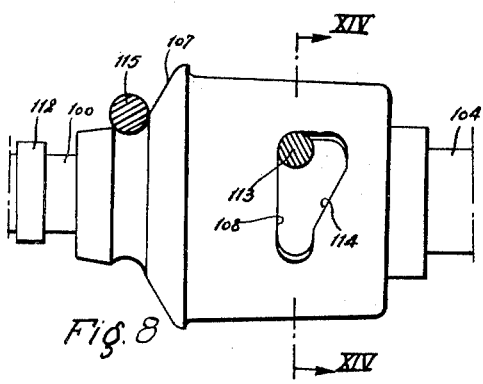
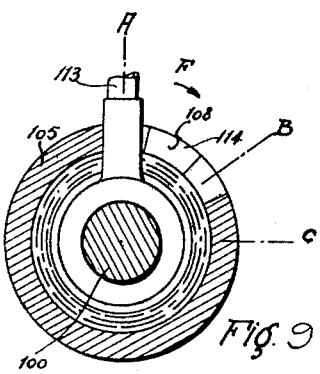

United States Patent Office 2,725,945
Patented Dec. 6, 1955

2,725,945
SELECTIVE BRAKE CONTROL MECHANISM FOR TRACTOR STEERING

Pierre Emile Beaudoux, Dieppe, and Francois Jacques Barthélemy Berry, Lille, France Application November 14, 1951, Serial No. 256,316
Claims priority, application France November 27, 1950
2 Claims. (Cl. 180—6.24)

This invention relates to a vehicle such as a tractor or the like.

Tractors and like vehicles, for the purpose of complying in satisfactory manner with the various conditions imposed on the same when in use, require the combination of a number of seemingly contradictory qualities. They must be flexible and strong, powerful but not bulky. They must be very stable with a maximum grip of the wheels on the ground irrespective of the nature of the latter, but nevertheless capable of turning within a very limited space, and so forth.

The known tractors do not, generally speaking, combine these qualities as a whole, which fact necessitates limitation of their use, for example, to a certain industrial or agricultural employment, and requires an engine of different design for other uses.

For the purpose of illustration, and taking by way of example the conventional form of tractor, the latter comprises two motor-driven rear wheels of large diameter, and at the front completing support of the vehicle on the ground, non-driving wheels of very small diameter. Such a tractor is undoubtedly generally satisfactory so far as its use on comparatively even ground is concerned. Against this, however, it is not so satisfactory as regards turning on a short radius or when it is required to ascend steep grades. The greater portion of its weight is in fact carried at the rear on the motor-driven wheels, and when traveling up a slope it is liable to tip up on end, the front portion of the tractor, which is light in weight, lifting about the rear axle. In consequence of this the bulk comprised in the width of the tractor is on the other hand a very important factor, more particularly having regard to the large dimensions usually given to the rear wheels and tires. It will be appreciated that such disadvantages prohibit the use of the tractor, for example for agricultural purposes when the ground has great slopes or is irregular, and that it is then necessary to resort to the use of animal power. In similar fashion when in industrial use the conformation of the traffic lines allows only a limited space for turning, it will be found necessary to adopt a special and costly service, making use of low-capacity engines, or even to provide a turntable installation.

The present invention has for its object to provide improvements in vehicles, such as tractors or the like, which will enable the disadvantages aforesaid to be overcome, and will permit of a simple and convenient construction of a vehicle, which is readily manageable and provides for flexible and efficient movement over all types of ground.

These improvements comprise more particularly the provision of the vehicle with four motor-driven wheels, and for driving these wheels a single differential gear, each planet gear of which is connected with the front and rear wheels located on the same side of the vehicle. In this way there are obtained the advantages which would arise from a propulsion by means of four wheels, while reducing the bulk and at the same time providing a simple arrangement of the various transmission elements of the vehicle.

According to the invention, these various elements are housed in the chassis of the vehicle, which forms both a framework and a casing, such arrangement enabling a very convenient and compact construction of the chassis to be obtained.

According to a further characteristic feature, each planet gear of the single differential is associated with an individual brake. It is thus possible to reduce greatly the radius of movement when making a turn. On the other hand braking of the vehicle can be obtained by simultaneous action on the two brakes without it being necessary to make provision for any other braking means.

For simultaneously actuating the two brakes when it is not desired to make a turn of small radius the two brakes are connected to two rotatable members respectively, each member being associated with a separate control pedal, and means are provided to make the two members rotate integrally from a hand control and from a change-speed lever when the latter is put in a high speed position.

These improvements provide that the rear wheels occupy a predetermined position with respect to the vehicle, while the front wheels are steerable and oscillatory, the latter wheels being capable of being moved in any direction about joints which are fixed with respect to the chassis of the tractor and being made subordinate one to the other, on the one hand by means of an element which co-ordinates the inclination of the wheels and on the other hand by a steering device on the vehicle. Such arrangement permits of permanent and simultaneous contact of the four motor-driven wheels with the ground irrespective of the nature of the ground. This flexibility of movement imparts to the vehicle, even under the most difficult conditions, the possibility of utilising the total propelling force of each driven wheel. When an obstacle or unevenness of the ground is encountered by a front wheel, the front wheels are inclined as a whole and the frame of the vehicle remains in equilibrium. Vice versa, when such unevenness of the ground is encountered by a rear wheel, the frame of the vehicle will conceivably be inclined, but the wheels will be located obliquely with respect to the frame, to assume a vertical position on horizontal ground. The vehicle as a whole thus retains a complete grip on the ground by means of its four wheels. Furthermore, the arrangement of the joints for the front wheels in accordance with the invention enables in particular the width of the chassis of the vehicle to be reduced, and in consequence the wheels to be moved as near as possible towards the longitudinal axis of the vehicle, while imparting to the steering wheels a sufficient latitude of movement. Bulkiness of the vehicle, particularly in its width, is thus considerably reduced.

On the other hand, according to the invention, the parts of the vehicle, and more particularly the unwieldy parts, such as the engine, the gear box, and so forth, are disposed towards the front of the vehicle, in such a way that the gross weight is distributed primarily over the front wheels, which enables all risk of a tipping of the vehicle, particularly at the sides, to be avoided.

Other features and advantages of the invention will be apparent from the following description of forms of embodiment thereof, which have been selected solely by way of example, given in conjunction with the accompanying drawing, in which:

Figure 5 is a longitudinal section of the device controlling the lateral brakes.

Figure 6 is a corresponding plan view with the control device in one position.

Figure 7 is a view similar to that of Figure 6, when the control device has a second position, when the device is actuated from the hand brake lever.

Figure 8 is a view similar to that of Figure 7, when the device is set in the second position from the change speed lever.

Figure 9 is a sectional view of the device along the line XIV—XIV in Figure 5.

Figure 1:
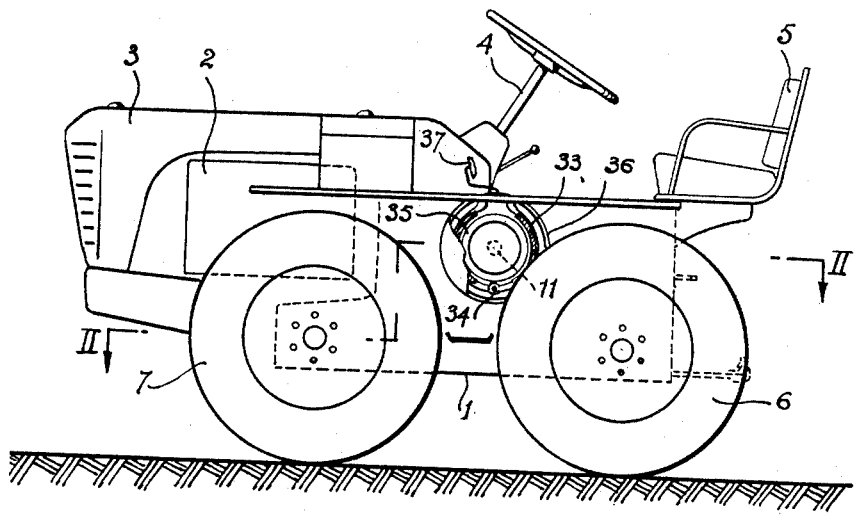
Figure 1 is an elevational view of a tractor according to the invention.

In the embodiment illustrated (Figures 1 and 2) the tractor according to the invention comprises a frame 1 forming both chassis and housing and carrying the various effective parts and the equipment of the tractor, such as the engine 2 and its hood 3, the steering gear with the steering wheel 4, the driving seat 5, etc.

This frame is supported by four driven wheels of equal diameter, two rear wheels 6 and two front wheels 7. The rear and front wheels are equal and the width between the wheels is hardly greater than the diameter of the wheels. Furthermore the weight of the tractor is distributed predominantly over the front wheels, due to disposition toward the front of the vehicle of the heavy parts such as the engine 2 set far forwardly, as shown. Such a distribution of weight is provided according to the invention with about two-thirds of the weight on the front wheels and one third of the weight on the rear wheels. The wheels are driven by way of a single differential gear 8 housed in the frame 1. The driving pinion 9 proceeding from the gear box (not shown) meshes with a toothed rim 10 of the differential. The latter comprises planet gears made rigid with two transverse and lateral shafts 11 each representing an extension of the other. Each lateral shaft 11 is rotatable in a bearing provided in the frame 1 and is furnished with a pinion 12 termed a central pinion. The latter is connected with the rear wheel 6 and the front wheel 7.

The transmission to the rear wheel 6 includes an intermediate pinion 13 mounted loosely on a shaft 14 which is rigid at its ends at 15 with the frame 1. The pinion 13 meshes at 16 with the central pinion 12 and at 17 with a pinion termed a rear driven pinion 18. The latter is carried by a shaft 19 connected with the rear wheel 6 and mounted in bearings 20 and 21 forming an integral part of the frame 1.

In similar fashion the transmission in respect of the front wheel 7 comprises a pinion termed an intermediate pinion 23 mounted loosely on a shaft 24 rigid at its ends at 25 with the frame 1. The intermediate pinion 23 meshes at 26 with the pinion 12 and at 27 with a pinion termed a front driven pinion 28. The latter is carried by a shaft 29 supported by bearings 30 and 31 integral with the frame 1.

Figure 2:
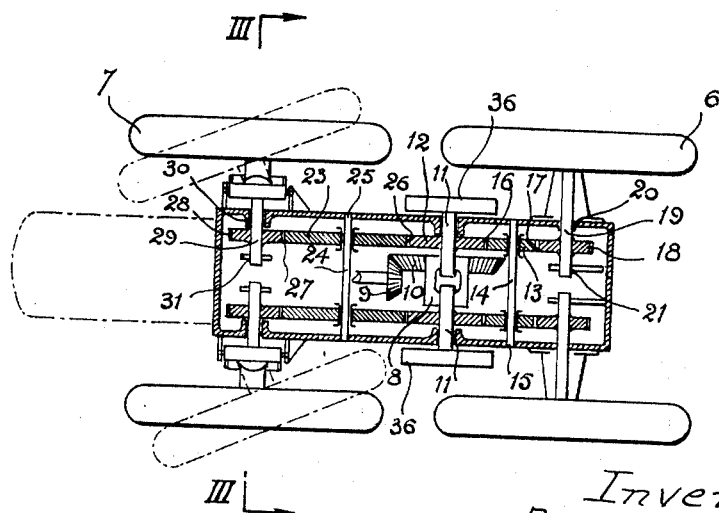
Figure 2 is a corresponding view, partially in section, taken along the broken line II—II in Figure 1.

As shown in Figure 2, the rear driven pinions 18 and the front driven pinions 28 are of equal diameter. Transmission of the motion from the central pinion 12 thus enables the same speed to be obtained in respect of the pinions 18 and 28, and in consequence the same speed in respect of the rear and front wheels 6 and 7, which are equal to one another. The intermediate pinions 13 and 23 are not necessarily of the same diameter, and if desired they can be replaced by a gear train comprising an odd number of pinions. In this way every latitude is allowed with regard to the location of the differential gear 8 in the frame 1. It will be appreciated that these intermediate pinions or trains of pinions can be replaced by a chain or other transmission. They are, however, to be preferred, as the transmission which they provide is particularly flexible, efficient and smooth.

Each lateral shaft 11 comprises at the end a brake consisting, for example, of two segments, such as 33, pivoted at 34. These segments operate about a disc 35 rigid with the shaft 11 and are housed in a casing 36. The operation of each brake is effected by means of a pedal 37 within reach of a driver sitting in the seat 5.

Thus, each pedal 37 can actuate separately each lateral shaft 11. However, means are provided according to the invention for a simultaneous braking action on both shafts 11.

These means (Figs. 5 to 9) include a transverse shaft 100 supported at 101 on the chassis of vehicle. On the shaft 100 are secured a lateral lever 102 associated to a lateral brake and the rod 103 of the corresponding pedal 37.

A sleeve 104, mounted for rotation but prevented from sliding on the shaft 100, has secured thereon the elements corresponding to the other brake, i. e. the other lateral lever 102' and the rod 103' of the other pedal 37'.

A part 105 mounted in sliding fashion by means of grooves 106 on the shaft 100 includes an external skew cam 107 and an aperture 108 forming another skew cam. The part 105 includes a toothed element 109 adapted to be put in or out mesh with a complementary toothed element 110 arranged on the sleeve 104. A spring means 111 is inserted between the sleeve 104 and the part 105, while an annular stop 112 disposed on the shaft 100 limits the stoppage of the part 105 under the action of the spring 111.

A hand-brake lever 113 is mounted to be rotary but prevented from sliding on the shaft 100 and passes through the aperture 108. The lever 113 has a substantially circular section while the aperture has a section generally wider than the lever 113 with a skew cam 114 so disposed that when the lever 113 is actuated around the shaft 100 in the direction of the arrow F, it cooperates with the skew 114 to put the toothed elements 109 and 110 in mesh.

A change-speed lever 115 is so disposed with respect to the part 105 that when it occupies a high speed position, it cooperates with the external skew 107 for putting the toothed elements 109 and 110 in mesh, while at the other positions it is spaced from the skew 107.

Figure 3:
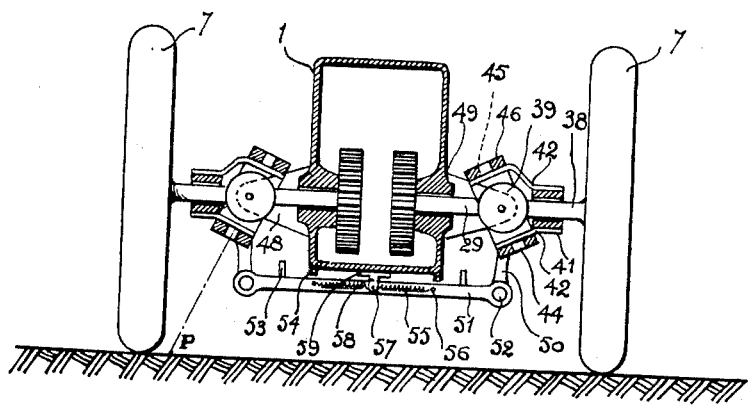
Figure 3 shows on an enlarged scale a sectional view taken along the line III—III in Figure 2.
Figure 4:
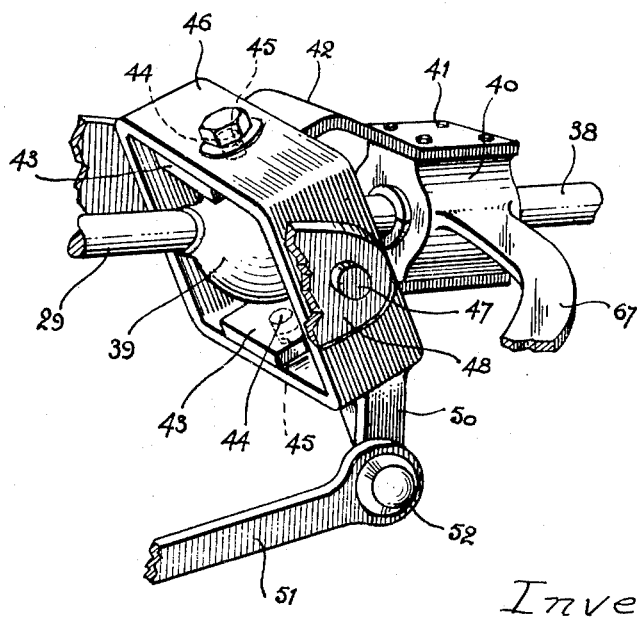
Figure 4 is a detail view in perspective and on an enlarged scale of an arrangement for oscillation of the front wheels in accordance with the invention.

The rear wheels 6 occupy a fixed position with respect to the frame 1, and are rigid with the lateral shafts 19. The front wheels 7 on the other hand are steerable and oscillatory. Each wheel 7 (Figs. 3 and 4) is for this purpose rigid with a spindle 38 connected by means of a homokinetic joint 39 with the corresponding shaft 29. The spindle 38 is carried by a bearing 40. The latter, which is of the ball or roller type, is rigid at 41 with two lugs 42 having flat projections 43, which are opposite and parallel to one another and are obliquely disposed with respect to the bearing 40. The flat portions 43 include swivel pins 44 engaging in bearings 45 formed in a frame 46. The latter is mounted to be rotary at 47 in supports 48 fixed at 49 to the frame 1. As may be seen from Figure 3, the axis of rotation of the frame 46 is longitudinal with respect to the tractor, whilst the axis of rotation of the bearing 40 on the frame 46 is disposed continuously in a vertical plane transversely with respect to the tractor. The axis of rotation of the bearing 40 on the frame 46 is selected in such a way that the extension of this axis intersects the ground at an imaginary point P situated on the inner side of the vehicle in the zone of contact of the wheel 7 with the ground, at a slight distance from the wheel.

The frames 46 of the two front wheels 7 are also furnished with levers 50 fixed rigidly to the frames 46 and joined together by a connecting rod 51 pivotally connected to the levers 50 at 52. Each pivot 52 is disposed longitudinally and is parallel to the axis of rotation of the frame 46 on the supports 48. The connecting rod 51 includes laterally two abutments 53 opposite abutments 54 fixed to the frame 1. These abutments permit of limitation of the transverse displacement of the connecting rod 51. If desired, such displacement can be damped by an arrangement such as that illustrated diagrammatically and constituted, for example, by two springs 55 connected at one end at 56 to the rod 51 and at the opposite end at 57 to a support 58 secured at 59 to the frame 1. The wheels are steered from the steering mechanism 4 on the vehicle through connections (not shown) to an arm 67 (Fig. 4) welded or secured in any other manner to the bearing 40.

In a straight line and on level ground the tractor proceeds in the manner of an ordinary vehicle, with the difference that owing to its four driven wheels it is capable of exercising a very considerable tractive force. When an obstacle or unevenness of the ground is encountered, the front wheels 7 are capable of tilting into an inclined position, each frame 46 (Figs. 3 and 4) rocking about the pivot 47 in such a way that, under the effect of the weight of the frame, the four wheels remain permanently and simultaneously in contact with the ground. Movement of the wheels 7 is co-ordinated by the connecting rod 51. The abutments 53 and 54 permit of limitation of the inclination of the wheels. The damping device formed, for example, by the springs 55 enables a flexible movement to be obtained when the nature of the ground causes the wheels to be tilted first towards one side and then to the other at short intervals.

In a straight line the holding of the steering wheel 4 compels the spindle 38 to take up a position in a vertical plane passing through the shaft 29, and the vehicle proceeds in the desired direction without deviation despite unevenness of the ground.

As it has been seen in the above, the imaginary point $p$ (Fig. 3) is located within the zone of contact on the ground of the front wheels 7 a slight distance away from the wheel. The force required for the steering of the vehicle is thus reduced. Nevertheless in turning the wheels exert a self-righting torque in the direction of advance of the vehicle, which permits of ready control of the latter, particularly when negotiating sharp turns.

During a turning movement the speed of the front and rear wheels on the inner side is lower than that of the wheels on the outside. The control by way of the differential gear 8 (Fig. 2) described in the above imparts at any given time the same speed to the front and rear wheels on the same side of the tractor and leaves entirely open, according to the radius of the curve, the ratio between the speeds of the inner and outer wheels.

The provision in accordance with the invention of an individual brake associated with each planet gear also enables the tractor to turn in a reduced space with a very small radius of movement. For this purpose it is sufficient to actuate, or even to block if necessary, the brake 33 situated on the inner side of the turn, the steering wheel being swung over to a maximum to facilitate the operation. The vehicle then turns about a very restricted space.

When a braking action on small radius is not desired, the shaft 100 and the sleeve 104 may be secured together with pulling down the hand-brake lever 113 from the inactive position A (Fig. 6) to the position B (Fig. 7) where the lever 113 pushing the skew 114 of the aperture 108 puts the toothed elements 109 and 110 in mesh. Thus the two lateral brakes are secured together and the braking action may be controlled either by continuing the pulling down of the lever 113 from the position B to the position C, whereby the part 105, the shaft 100 and the sleeve 104 are turned as a single member, or by actuating one of the pedals 37.

In addition to this intentional control by the lever 113 between the A and B positions for securing together the shaft 100 and the sleeve 104, the latter are automatically secured together, according to the invention, when the speed-change lever 115 is passed from a non high speed position (Fig. 6) to a high speed position (Fig. 8). The lever 115 pushes then, as previously indicated, the skew 107 of the part 105, whereby the toothed elements 109 and 110 are put in mesh. The aperture 108 is so wide as to permit of free movement of the sleeve 105 around the lever 113 in the A position.

There is so provided a very flexible control device as the lateral brakes may be actuated either separately (Fig. 6) or simultaneously (Fig. 7) according as the small radius or normal braking effect is desired and that the simultaneous braking actions are obligatory when the tractor moves with the speed change casing being in a high speed position.

The distribution of the weight of the vehicle, which is primarily over the front wheels, as has been stated in the above and is disclosed by the drawings by disposition of the weighty portions towards the front, enables the danger of a tipping up of the vehicle to be eliminated, particularly at the side, where this danger is normally greater. The tractor can thus be used for work on hillsides, particularly in wine regions, where up to the present it has only been possible to employ endless track vehicles.

The improvements according to the invention permit, therefore, of a simple and convenient construction of vehicle which is readily manageable and is flexible and efficient in movement over all kinds of ground.

Naturally, the invention is not limited to the embodiments described and illustrated, but includes all possible modifications in the construction of its various parts. As an example, the predetermined position of the rear wheels may be controlled through a hydraulic device instead of a rack device, etc.

We claim:

1. A vehicle of the character described comprising a chassis, a motor, a change speed lever, a pair of steerable front wheels, a pair of rear wheels, a central differential gear connected to the motor, and provided with two semi-shafts extending transversely of the vehicle intermediate the front and rear wheels, means providing a driving connection between each semi-shaft and the front and rear wheels on the same side of the vehicle, an individual brake associated with each semi-shaft, an individual actuator for each brake including a rotatable member, means for interlocking the two rotatable members to effect simultaneous braking action on both brakes, a common actuator for simultaneously actuating both brakes through the rotatable members and means operable by shifting the change speed lever into high speed position or by shifting the common actuator to braking position for actuating the interlocking means whereby the rotatable members are interlocked.

2. A vehicle according to claim 1 in which the interlocking means comprises a collar axially slidable but rotatably fixed on one of said rotatable members, cooperating teeth on the collar and the other rotatable member engageable upon sliding the collar to one position and disengageable upon sliding the collar to another position, and cam means on the collar engageable with the change speed lever in high speed position or during movement of the common actuator towards braking position for shifting the collar to a position to effect engagement of said teeth.

References Cited in the file of this patent

UNITED STATES PATENTS

| | | |
|---|---|---|
| 608,517 | Gray | Aug. 2, 1898 |
| 1,078,107 | Nygren | Nov. 11, 1913 |
| 1,314,093 | Pifer | Aug. 26, 1919 |
| 1,353,393 | Haupt | Sept. 21, 1920 |
| 1,363,327 | Larsh | Dec. 28, 1920 |
| 1,446,121 | Johnston et al. | Feb. 20, 1923 |
| 1,451,194 | Adams | Apr. 10, 1923 |
| 1,505,533 | Blackmore | Aug. 19, 1924 |
| 1,928,136 | Rodgers | Sept. 26, 1933 |
| 1,956,253 | Schoenrock | Apr. 24, 1934 |

FOREIGN PATENTS

| | | |
|---|---|---|
| 454,818 | Great Britain | Oct. 8, 1936 |